United States Patent
Barnell et al.

(10) Patent No.: US 9,908,993 B1
(45) Date of Patent: Mar. 6, 2018

(54) HYBRID FIBER LAYUP AND FIBER-REINFORCED POLYMERIC COMPOSITES PRODUCED THEREFROM

(71) Applicant: Cornerstone Research Group, Inc., Dayton, OH (US)

(72) Inventors: Thomas J. Barnell, Dayton, OH (US); Sean P. Garrigan, Beavercreek, OH (US); Michael D. Rauscher, Beavercreek, OH (US); Benjamin A. Dietsch, Dayton, OH (US); Gary N. Cupp, Waynesville, OH (US)

(73) Assignee: Cornerstone Research Group, Inc., Miamisburg, OH (US)

( * ) Notice: Subject to any disclaimer, the term of this patent is extended or adjusted under 35 U.S.C. 154(b) by 184 days.

(21) Appl. No.: 14/875,978

(22) Filed: Oct. 6, 2015

Related U.S. Application Data (60) Provisional application No. 62/060,241, filed on Oct. 6, 2014.

(51) Int. Cl.
| | | |
|---|---|---|
| B29C 70/36 | (2006.01) | |
| B29C 70/38 | (2006.01) | |
| C08J 5/24 | (2006.01) | |
| C08K 7/06 | (2006.01) | |
| B29C 70/02 | (2006.01) | |
| B32B 3/08 | (2006.01) | |
| B32B 3/10 | (2006.01) | |
| B32B 5/28 | (2006.01) | |
| B32B 27/04 | (2006.01) | |
| B32B 27/38 | (2006.01) | |
| B29K 507/04 | (2006.01) | |
| B29K 79/00 | (2006.01) | |
| B29K 63/00 | (2006.01) | |
| B29K 67/00 | (2006.01) | |
| B29L 9/00 | (2006.01) | |

(52) U.S. Cl.
CPC ............... *C08K 7/06* (2013.01); *B29C 70/02* (2013.01); *B29K 2063/00* (2013.01); *B29K 2067/00* (2013.01); *B29K 2079/085* (2013.01); *B29K 2507/04* (2013.01); *B29L 2009/00* (2013.01)

(58) Field of Classification Search
CPC .......... C08J 5/24; B29C 70/36; B29C 70/443; B29C 70/546; B29C 70/547; B32B 3/02; B32B 3/08; B32B 3/085; B32B 3/10; B32B 5/28; B32B 27/04; B32B 27/38
USPC ........... 264/241, 257, 258; 428/297.4, 300.1, 428/300.7, 301.4
See application file for complete search history.

(56) References Cited

U.S. PATENT DOCUMENTS

| | | | |
|---|---|---|---|
| 4,167,430 A | 9/1979 | Arachi et al. | |
| 4,936,939 A | 6/1990 | Woolum et al. | |
| 4,944,824 A | 7/1990 | Gupta et al. | |
| 5,569,508 A | 10/1996 | Cundiff | |
| 6,752,190 B1 | 6/2004 | Boll et al. | |
| 7,192,634 B2 | 3/2007 | Carter et al. | |
| 8,163,209 B2 | 4/2012 | Glazebrook | |
| 8,308,889 B2 | 11/2012 | Glancy et al. | |
| 8,356,989 B2 | 1/2013 | Waldrop et al. | |
| 8,728,262 B2 | 5/2014 | Miller et al. | |
| 8,900,391 B2 | 12/2014 | Silcock et al. | |
| 2002/0022422 A1 | 2/2002 | Waldrop, III et al. | |
| 2008/0197526 A1 | 8/2008 | Shafi et al. | |
| 2009/0131556 A1 | 5/2009 | Honda et al. | |
| 2009/0189320 A1 | 7/2009 | Bolick et al. | |
| 2009/0252921 A1 | 10/2009 | Bottler et al. | |
| 2009/0269557 A1* | 10/2009 | Stiesdal ............ B29C 70/88 428/195.1 |
| 2010/0143145 A1 | 6/2010 | Jones | |
| 2010/0196654 A1 | 8/2010 | Maheshwari | |
| 2011/0077328 A1 | 3/2011 | Valette et al. | |
| 2011/0139344 A1 | 6/2011 | Watson et al. | |
| 2011/0254196 A1 | 10/2011 | Vauchel et al. | |
| 2013/0096232 A1 | 4/2013 | Theophanous et al. | |
| 2013/0225788 A1 | 8/2013 | Meegan | |
| 2014/0370237 A1 | 12/2014 | Ponsolle et al. | |
| 2015/0099834 A1 | 4/2015 | Barnell et al. | |

FOREIGN PATENT DOCUMENTS

| | | | | |
|---|---|---|---|---|
| EP | 662492 A1 | 7/1995 | | |
| GB | 2172542 A | 9/1986 | | |
| GB | 2483730 A * | 3/2012 | ............ | B29C 70/54 |
| RU | 2488612 C1 | 7/2013 | | |
| WO | WO 2006/089696 A1 * | 8/2006 | ............ | B29C 70/48 |
| WO | 2013075716 A1 | 5/2013 | | |

OTHER PUBLICATIONS

Machine translation of WO 2006/089696 A1 (no date).*
Barnell et al., "Evaluation of No-Oven, No-Autoclave Composite Manufacturing", Society for the Advancement of Material and Process Engineering with permission, Open Conference Systems, Long Beach, California May 6-9, 2013, http://www.memberjournal.com/SAMPE/index.php?conference.
Dierksen, "Optimization of High Temperature VARTM Process", Final Report, Nanotechnology and Material Systems REU, Summer of 2006, pp. 1-7.
Kado Corporation, "High Performance Composites ", http://www.kado-corporation.com/html/en/technology.html, May 15, 2010.
Koutsos, V., Engineering properties of polymers; ICE Manual of Construction Materials; Jan. 2009; pp. 585-591; Institution of Civil Engineers.

(Continued)

*Primary Examiner* — Michael J Feely
(74) *Attorney, Agent, or Firm* — Dinsmore & Shohl LLP (57) ABSTRACT

Embodiments of a hybrid fiber layup used to form a fiber-reinforced polymeric composite, and a fiber-reinforced polymeric composite produced therefrom are disclosed. The hybrid fiber layup comprises one or more dry fiber strips and one or more prepreg fiber strips arranged side by side within each layer, wherein the prepreg fiber strips comprise fiber material impregnated with polymer resin and the dry fiber strips comprise fiber material without impregnated polymer resin.

7 Claims, 5 Drawing Sheets

(56) References Cited

OTHER PUBLICATIONS

Gardiner, "Resin-Infused MS-21 Wings and Wingbox", CompositesWorld, Jan. 1, 2014, http://www.compositesworld.com/articles/resin-infused-ms-21-wings-and-wingbox.

Dietsch et al, "No-oven, No-autoclave Composite Tool Fabrication", Society for the Advancement of Material and Process Engineering.

Miller et al., "Study of Out-time on the Processing and Properties of IM7/977-3 Composites", ntrs.nasa.gov/archive/nasa/casi.ntrs.nasa.gov/20110016052.pdf.

Fabrication Methods, CompositesWorld, Jan. 1, 2014, http://www.compositesworld.com/articles/fabrication-methods.

"Fabrication Methods (2015)", CompositesWorld, Jan. 9, 2015, http://www.compositesworld.com/articles/fabrication-methods-2015.

Girardy et al., "An Innovative Composite Solution for Cost-effective Primary Aircraft Structures", JEC Composites Magazine, No. 80 Apr.-May 2013, pp. 36-38.

Kaps et al., "Hybrid Fabrication Route—Cost Efficient CFRP Primary Airframe Structures", 25th International Congress of the Aeronautical Sciences, 2006, pp. 1-11.

Fratta et al., "Approach to Optimize Combined Out-of-autoclave Prepreg/LCM Process for Integrated Structures" (Abstract Only), 2012 SAMPE International Symposium and Exhibition—Emerging Opportunities: Materials and Process Solutions.

Machine translation of RU 2488612 C1, provided by Espacenet (no date).

Partial Translation of RU 2488612 C1, provided by USPTO translations branch (no date).

Technical Data Sheet for Stretchlon 700, provided by Airtech International, Inc (2013).

Technical Data Sheet for DER 330, provided by Dow (no date).

\* cited by examiner

HYBRID FIBER LAYUP AND FIBER-REINFORCED POLYMERIC COMPOSITES PRODUCED THEREFROM

CROSS-REFERENCE TO RELATED APPLICATIONS

This application claims priority to U.S. Provisional Application 62/060,241 filed Oct. 6, 2014, which is incorporated by reference herein in their entirety.

STATEMENT REGARDING FEDERALLY SPONSORED RESEARCH OR DEVELOPMENT

The invention was made with U.S. Government support under NASA Contract Numbers NNX14CM14P and NNX15CM04C awarded by NASA to Cornerstone Research Group Inc. The U.S. Government has certain rights in this invention.

FIELD OF INVENTION

Embodiments of the present disclosure generally relate to fiber-reinforced polymeric composites and specifically relate to hybrid fiber layups used to produce fiber-reinforced polymeric composites.

BACKGROUND

In composite manufacturing, particularly in the aerospace industry, very large high-performance composites are used to prevent a point of weakness from forming between two smaller fused composites. These large composites however, often require large autoclave curing to achieve desired properties such as a high glass transition temperature ($T_g$) and compression strength.

Composites may be manufactured using either dry fiber material or "prepreg" fiber material (pre-impregnated fiber reinforced with a resin system). Using dry fiber material has many benefits, including lower cost for required capital equipment, improved breathing of trapped air, removal of volatiles, and improved compaction with only atmospheric pressure. However, dry fiber layup and infusion is messy, inefficient, and may produce composites with lower strength and toughness. Conversely, prepreg fiber material may be used. Prepreg fiber material has superior composite properties with increased toughness and strength, but does not allow for breathing, contains more undesirable volatiles, requires more rigorous processing conditions to achieve high performance and thus can be quite costly.

Accordingly, there is a need for improved fiber-reinforced polymeric composites which includes the benefits of fiber-reinforced polymeric composites produced from prepreg fiber and dry fiber infusion.

SUMMARY

Embodiments of the present disclosure disclose a unique hybrid fiber layup that harnesses the benefits of both infused dry fiber material and prepreg fiber material in producing fiber-reinforced polymeric composites having improved breathability, a low volatiles level, and improved compaction with only atmospheric pressure, all while producing a composite with extraordinary OHC strength and $T_g$. In fact, the hybrid fiber composite of the present disclosure actually outperforms traditional oven-cured prepreg in open hole compression (OHC) strength, a metric used to evaluate the toughness and strength of a composite.

In one embodiment of the present disclosure, a hybrid fiber layup comprising one or more layers is provided. The hybrid fiber layup comprises one or more dry fiber strips and one or more prepreg fiber strips arranged side by side within at least one of the layers, wherein the prepreg fiber strips comprise fiber material impregnated with polymer resin; and the dry fiber strips comprise fiber material without impregnated polymer resin.

According to another embodiment of the present disclosure, a fiber-reinforced polymeric composite a top surface and a bottom surface is provided. The fiber-reinforced polymeric composite comprises a plurality of prepreg zones and a plurality of non-prepreg zones disposed across the fiber-reinforced polymeric composite, wherein the prepreg zones have a fiber volume fraction greater than a fiber volume fraction of the non-prepreg zones, wherein the prepreg zones and the non-prepreg zones comprise fiber material impregnated with cured polymer resin. Moreover, the fiber-reinforced polymeric composite comprises a void volume fraction of less than 1.0%, and has a glass transition temperature of at least about 70° C.

According to yet another embodiment of the present disclosure, a method for producing a fiber-reinforced polymeric composite is provided. The method comprises providing a mold defining a shape for the fiber-reinforced polymeric composite, applying a hybrid fiber layup over the mold, wherein the hybrid fiber layup comprises one or more layers, wherein each layer comprises one or more dry fiber strips and one or more prepreg fiber strips arranged side by side across each layer, wherein the prepreg fiber strips comprise fiber material impregnated with polymer resin and the dry fiber strips comprise fiber material without impregnated polymer resin. Moreover, the method comprises covering the mold and the hybrid fiber layup in a vacuum enclosure, performing a vacuum on the vacuum enclosure to produce a pressure gradient, infusing a reactive mixture of uncured polymer resin and curing agent into the dry fiber strips of the hybrid fiber layup under vacuum conditions, and producing the fiber-reinforced polymeric composite by curing the dry fiber strips infused with polymer resin and curing agent and the prepreg fiber strips, wherein the fiber-reinforced polymeric composite has a glass transition temperature of at least about 70° C.

These and additional features provided by the embodiments of the present disclosure will be more fully understood in view of the following detailed description and in conjunction with the drawings.

The embodiments set forth in the drawings are illustrative in nature and not intended to be limiting of the invention defined by the claims. Moreover, individual features of the drawings will be more fully apparent and understood in view of the detailed description.

DETAILED DESCRIPTION

Embodiments of the present disclosure include, among other things, a hybrid fiber layup, a fiber-reinforced polymeric composite, and a method for producing a fiber-reinforced polymeric composite. The following description of the embodiments is exemplary and illustrative in nature and is in no way intended to be limiting in its application or uses.

The term "hybrid fiber layup," as used in the present disclosure herein, means one or more layers of fiber material applied onto a mold for the production of fiber-reinforced polymeric composite, wherein at least one or more of the layers comprise dry fiber strips and prepreg fiber strips disposed side by side across the layer.

The term "prepreg fiber," as used in the present disclosure herein, describes a fiber or fabric material that is pre-impregnated with a polymer resin prior to including in at least one layer of the hybrid fiber layup applied on the mold.

The term "dry fiber," as used in the present disclosure herein, describes a fiber or fabric material that is absent or substantially free of polymer resin prior to including in at least one layer of the hybrid fiber layup applied on the mold.

The term "layup," as used in the present disclosure herein, describes stacking one or more layers of fiber material.

The term "ply or plies," as used in the present disclosure herein, describes a layer of fiber material.

The term "fiber-reinforced polymeric composite," as used in the present disclosure herein, describes a hybrid fiber layup that has been cured.

The term "NONA process," as used in the present disclosure herein, describes the No-Oven No-Autoclave process disclosed in U.S. patent application Ser. No. 14/045,400, entitled, "FIBER-REINFORCED EPOXY COMPOSITES AND METHODS OF MAKING SAME WITHOUT THE USE OF OVEN OR AUTOCLAVE," which is hereby incorporated by reference in its entirety.

Referring now to FIGS. 1, 2, 4 and 5, embodiments of the hybrid fiber layup 101 are depicted. In some embodiments of the present disclosure, an automatic tape laying (ATL) device 103 or automated fiber placement (AFP) may be used to apply the hybrid fiber layup 101; however, manual placement is also contemplated.

Figure 1:
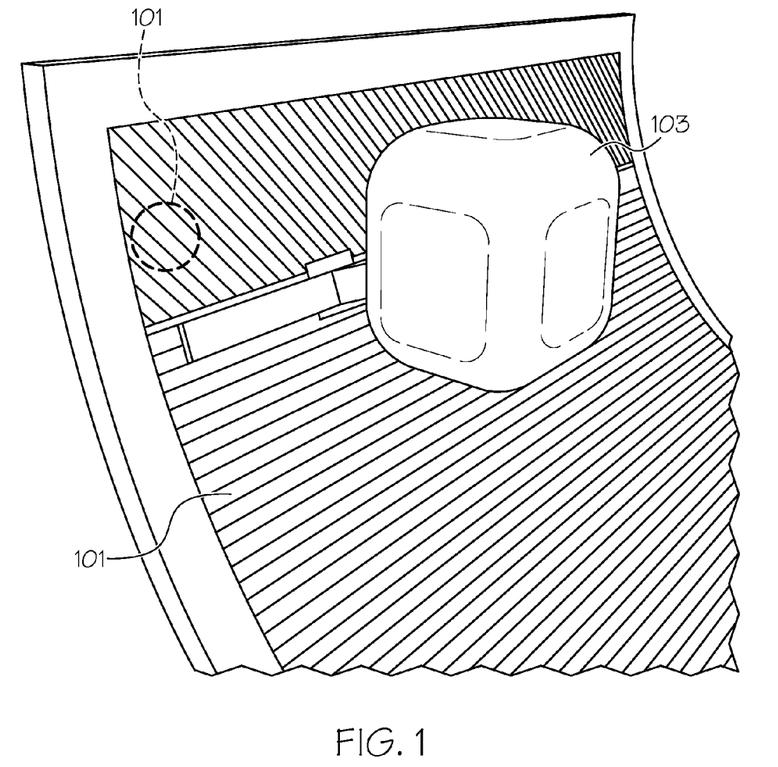
FIG. 1 is a schematic view of a hybrid fiber layup according to one or more embodiments of the present disclosure.
Figure 2:
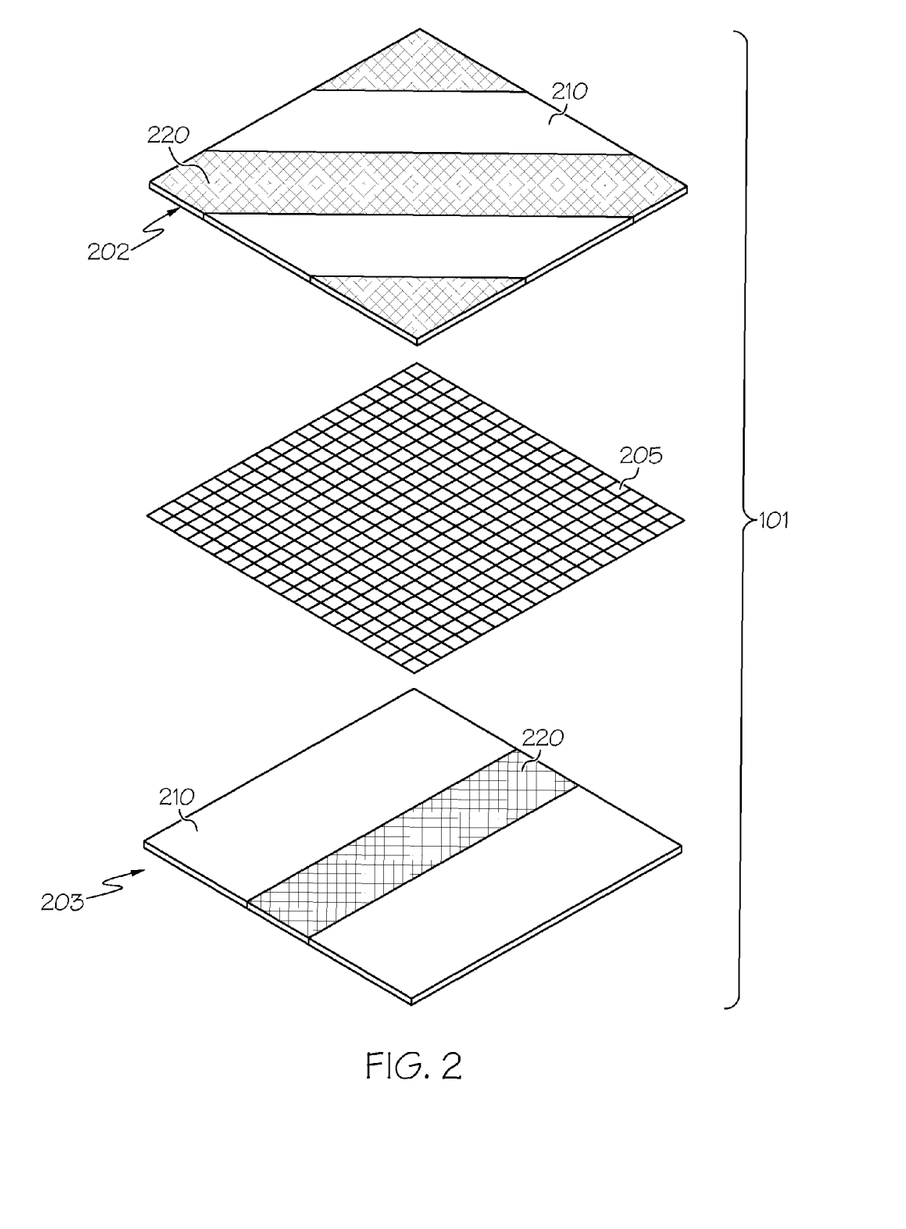
FIG. 2 is a schematic exploded view of the hybrid fiber layups depicted in FIG. 1 according to one or more embodiments of the present disclosure.

Referring to FIG. 2, the hybrid fiber layups 101 comprised one or more layers, wherein at least one of the layers includes dry fiber strips 210 and one or more prepreg fiber strips 220 arranged side by side. As shown in FIG. 2, various arrangements of prepreg fiber strips and dry fiber strips are possible for each layer. For example, it is contemplated to have multiple layers with multiple different arrangements of prepreg fiber strips and dry fiber strips. The embodiment of FIG. 2 depicts two layers 202 and 203 of the hybrid fiber layup 101 and an optional scrim layer 205 between the two layers 202 and 203; however, the scrim layer or other layers such as thermoplastic veils are merely optional to maintain dry fiber strips in place. The hybrid fiber layup may have three distinct ply-to-ply (or layer to layer) interfaces: prepreg-to-prepreg, dry fiber-to-dry fiber, and prepreg-to-dry fiber.

In accordance with some embodiments, the dry fiber strips 210 and prepreg fiber strips 220 may be arranged in a parallel alternating pattern, angular pattern, or combinations thereof. The dry fiber strips and prepreg fiber strips may be arranged in diagonal strips, straight strips, or combinations thereof. Within each layer of a hybrid fiber layup 101 or within the entire hybrid fiber layup 101, the ratio by area of dry fiber strips 210 and prepreg fiber strips 220 (i.e. the ratio of the total surface area occupied by the different types of fiber strips within a layer) may be the same or varied between one layer and the next throughout the hybrid fiber layup 101. In accordance with one embodiment, the ratio by area of dry fiber strips 210 to prepreg fiber strips 220 may be from 10:1 to 1:10, or from 10:1 to 1:1, or from 10:1 to 2:1.

Figure 4:
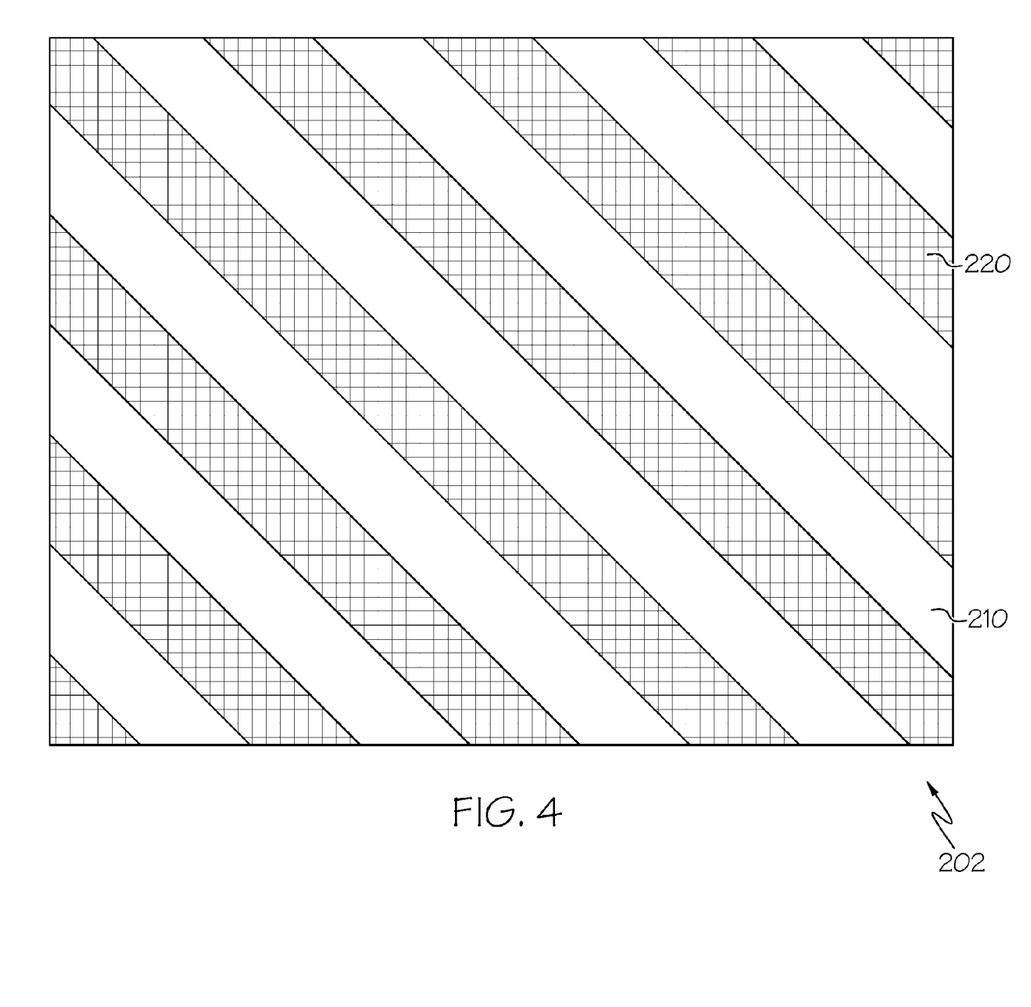
FIG. 4 is a schematic view of one possible configuration of a hybrid fiber layup in which the dry fiber strips and prepreg fiber strips are arranged in a parallel alternating diagonal striped pattern according to one or more embodiments of the present disclosure.
Figure 5:
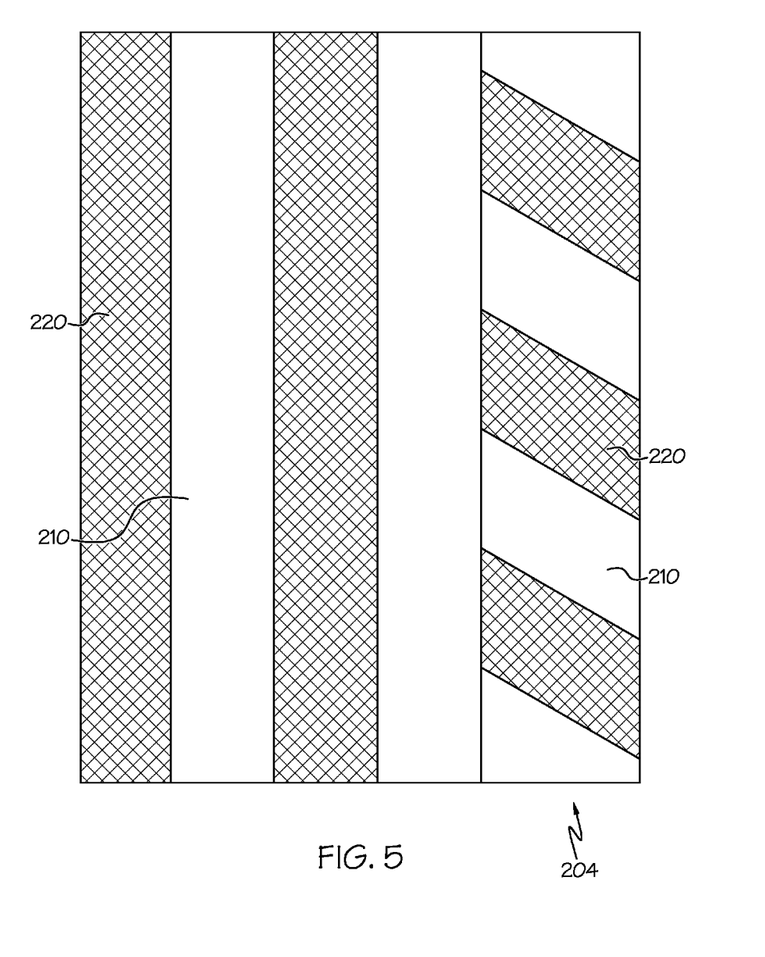
FIG. 5 is a schematic view of another possible configuration of a hybrid fiber layup in which the dry fiber strips and prepreg fiber strips are arranged in a combination of parallel alternating straight strips and angular pattern diagonal strips according to one or more embodiments of the present disclosure.

In orientational embodiments, the prepreg fiber strips 220 or dry fiber strips 210 may comprise an angular alternating pattern in diagonal strips as shown in FIG. 4 or layer 202 of FIG. 2, a parallel alternating pattern in straight strips as shown in layer 203 of FIG. 2, or any combination thereof. Referring to the layer 204 embodiment of FIG. 5, the dry fiber strips 210 and prepreg fiber strips 220 are arranged in both an angular alternating pattern in diagonal strips and a parallel alternating pattern in straight strips.

The hybrid fiber layup 101 may have three distinct interfaces comprising prepreg-to-prepreg portions, prepreg-to-dry fiber portions, dry fiber-to-dry fiber portions, or any combinations thereof. The dry fiber strips 210 and prepreg fiber strips 220 may have uniform or varied widths and lengths to tailor for infusion efficiency during processing and mechanical properties of cured composite part. In case where there are different widths, it is contemplated to use larger width strips or use multiple side by side dry fiber strips 210 or multiple side by side prepreg fiber strips 220.

Various fiber materials are contemplated as suitable for the dry fiber strips 210, the prepreg fiber strips 220, or both. In accordance with some embodiments, the dry fiber strips 210 or prepreg fiber strips 220 may comprise cloth or unidirectional carbon fiber products. In other embodiments, the dry fiber strips 210 and/or prepreg fiber strips 220 may comprise one or more components including but not limited to: carbon fiber, glass fiber, aramid fiber, boron fiber, basalt fiber, ceramic fiber, quartz fiber, alumina fiber, polymer fiber, or combinations thereof. Structurally, the dry fiber strips 210 and/or prepreg fiber strips 220 could comprise various materials, including but not limited to random mats, scrims, chopped fibers, knits, unidirectional plies, three-dimensional weaves, three-dimensional fiber preforms, plain weave fabrics, twill fabrics, harness satin fabrics, or combinations thereof. In one embodiment, the dry fiber strips 210 and/or prepreg fiber strips 220 may comprise carbon fiber. In a specific embodiment, the prepreg fiber strips may comprise autoclave or out of autoclave (OoA) prepreg tapes, while the dry fiber strips may comprise unidirectional (UD) fiber, woven, or non-woven fiber tows, tapes, or fabrics.

The prepreg fiber is also impregnated with polymer resin. In one or more embodiments, the polymer resin may comprise uncured thermoset resin, partially cured thermoset resin, thermoplastic resin, or combinations thereof. In one or more embodiments, the uncured or partially cured thermoset resin may comprise one or more components selected from the group consisting of epoxy, bismaleimide, vinyl ester, polyester, cyanate ester, and combinations thereof. Without being bound by theory, the polymer resin is a partially cured thermoset epoxy resin comprising at least one component selected from the group consisting of diglycidyl ether of bisphenol A, diglycidyl ether of bisphenol F, resorcinol diglycidyl ether, N,N-Diglycidyl-4-glycidyloxyaniline, brominated diglycidyl ether of bisphenol A, novolac epoxy, tetraglycidyl meta-xylenediamine, 1,4-butanediol diglycidyl ether, 4,4'-Methylenebis(N,N-diglycidylaniline), tris(4-hydroxyphenyl)methane triglycidyl ether, and tris(2,3-epoxypropyl)isocyanurate. The partially cured epoxy resin may have an enthalpy of reaction range of about 200 to about 500 J/g and may have a viscosity greater than 100,000 centipoise at 20° C.

In accordance with other embodiments, the polymer resin may comprise a thermoplastic resin such as polyetheretherketone (PEEK), polyetherketoneketone (PEKK), polyphenylene sulfide (PSS), polyether sulfone (PES), polyetherimide (PEI), polyamide (PA), polycarbonate, polyacrylonitrile-butadiene-styrene (ABS), polyethylene (PE), polypropylene (PP), polyethylene terephthalate (PET), poly(methyl methacrylate) (PMMA), combinations thereof, or similar compounds.

In accordance with further embodiments, the polymer resin in the prepreg fiber strips 220 may also comprise a curing agent. The curing agent may include but is not limited to one or more of the following: 4,4'-methylene-bis(2-chloroaniline), 4,4'-diaminodiphenyl sulfone, isophorone diamine, diethyltoluenediamine, dimethylthiotoluenediamine, 4,4'-diaminodiphenylmethane, 1,3'-phenylenediamine, piperazine, aminoethyl piperazine, triethylenetetramine, 5-amino-1,3,3-trimethylcyclohexanemethylamine, m-xylylenediamine, bis(p-aminocyclohexylmethane), 2,4-diaminotoluene, N,N,dimethylethylenediamine, 4,4' diaminodiphenylsulfone and combinations thereof.

Commercial examples of prepreg fiber used in the prepreg fiber strips may include, but are not limited to: Cycom® 977-3 epoxy resin with IM7 carbon fiber manufactured by Cytec Industries Inc; MTM® 45-1 manufactured by Cytec Industries Inc; and HexTow® IM7 carbon fiber with HexPly 8552-1 manufactured by Hexcel® Inc.

As stated above, the hybrid fiber layup is utilized to produce a fiber-reinforced polymeric composite (for example, a fiber-reinforced polymeric composite) via various contemplated methodologies. In one or more embodiments, the method comprises applying the hybrid fiber layup to mold to shape the hybrid fiber layup. The mold may comprise at least one of the following components: polymer, glass, ceramic, carbon-carbon composite, fiber-reinforced polymer composite, metal, wood, polymeric foam, ceramic foam, glass foam, syntactic foam, carbon foam, metal foam, a honeycomb structure, a sandwiched structure and combinations thereof. In one embodiment the mold may comprise polymeric foam. For the polymer foam material, it is contemplated that at least one component of the foam is selected from the group consisting of polystyrene, epoxy, phenyl maleimide (PMI), polyetherimide (PEI), polyurethane, polyamide, acrylic, and combinations thereof.

Various properties may also be used to define the mold of the present of disclosure. For example, the mold may have a specific heat capacity from 0.1 to 3.0 J/g·K. Polymeric molds may have a specific heat capacity of from about 1.0 to about 3.0 J/g·K, or from about 1.2 to about 2 J/g·K. Metal molds may have a specific heat capacity of from about 0.1 to about 1.2, or between about 0.2 to about 0.9 J/g·K.

Further, the mold may have a thermal conductivity from about 0.01 to about 0.2 W/m·K, or a thermal conductivity from about 0.01 to about 0.10 W/m·K, or from about 0.03 to about 0.07 W/m·K. Additionally, the mold may have a coefficient of thermal expansion from about 2 to about 80 ppm/° C., or from about 40 to about 60 ppm/° C. Further, the mold, for example, the polymeric foam mold, may have a density of from about 0.05 to about 0.5 g/cc, or from about 0.2 to about 0.35 g/cc. Moreover, the mold may have a glass transition temperature of from about 100 to about 500° C., or from about 120 to about 300° C., or from about 200 to about 250° C.

Optionally, it may be desirable to apply one or more coatings or layers over the mold prior to applying the hybrid fiber layup. As used herein, the terms "over" or "on" may mean directly adjacent or contacting another layer, but also contemplates that intervening layers may be disposed therebetween. In one or more embodiments, the mold may include thereon a release layer, a face-sheet, a sealing coating, a non-stick coating, or combinations thereof. Generally, a release layer is applied over the mold and generally attached to the mold. The release layer may be used to seal the mold before the infusion. If the mold includes a sealing coating, an additional face-sheet or release layer may not be needed. After the infusion and curing process is conducted, the release layer may be used to separate the resulting cured hybrid fiber layup composite from the mold. Various components are contemplated for the face-sheet, for example, carbon fiber-epoxy composite, metal, and combinations thereof. Generally, the face-sheet is applied over the mold using a suitable adhesive and/or tape.

Similarly, various compositions are contemplated for the sealing coating. In one embodiment, the sealing component comprises a polymer resin selected from the group consisting of vinyl ester, epoxy, or silicone and is applied via any suitable coating or deposition technique. Optionally, the sealing coating may also perform a non-stick function, which prevents the hybrid fiber layup from sticking to the mold 10 during de-molding. Further as stated above, it is contemplated to use a non-stick or release coating which may comprise various suitable components. For example, the non-stick or mold release coating may be selected from the group consisting of silane, siloxane, silicone, polytetrafluoroethylene, hydrocarbon, and mixtures and combinations thereof. A suitable seal coating commercial embodiment in accordance with the present disclosure is Frekote® 55-NC™ produced by Henkel International.

Additionally, it is contemplated to use a combination of coatings or layers prior to the addition of the hybrid fiber layup. In one embodiment, a seal coating and a mold release agent may be used together. For example, a suitable surface primer for sealing a mold surface, such as the Duratec Vinyl Ester Primer® from Hawkeye Industries, may be applied to seal the porous polymeric foam mold surface as an alternative to an adhesive release film, facesheet, or other sealing material. Then a mold release agent, such as Frekote 55-NC is applied thereon.

Next, the layers of the hybrid fiber layup may be placed on the mold, specifically by application of dry fiber strips and prepreg fiber strips side-by-side in one of many contemplated multiple layer arrangements as shown in the FIGS. The structure and composition of the dry fiber strips and prepreg fiber strips are discussed above. Additional layers may then be stacked on top of one another; this is referred to as the layup process. Without being bound by theory, unlike the stacking of solely dry fiber strips, the use of prepreg fiber strips, which has inherent tackiness, allows for easier fiber/fabric placement preventing the stack from sliding or shifting in the placement process. In some embodiments, a tape or adhesive release film layer may be utilized on top of the mold prior to application of the hybrid fiber layup; however, the tackiness of the prepreg fiber strips may allow direct application on the mold without an intervening tape or adhesive release film layer.

Depending on the industrial application and the part thickness desired, it may be desirable to use multiple layers for the hybrid fiber layup. While the majority of the contemplated embodiments utilize up to 300 layers, the present process is suitable for greater than 300 layers as well. In specific embodiments, the hybrid fiber layup may include from 1 to 100 layers, or from 1 to 30 layers.

Optionally, the present method may utilize the step of adding at least one mesh flow media over the hybrid fiber layup to facilitate distribution and flow of the resin through the thickness of the hybrid fiber layup, primarily into the dry fiber strips. As would be familiar to one of ordinary skill in the art, flow media layer options are vast in design, material, and dimension. The defined channels of the flow media are generally uniform; however, it is contemplated to have differing channel diameters within the same flow media layer. In specific embodiments, the flow media layers may be layers comprised of woven material such as Style 6781 S2-Glass fabric from Fibre Glast, or non-woven materials. Examples of non-woven materials that can be used as flow media layers are knit material e.g. Breatherflow 60 from Airtech, pressed directional materials, such as Resinflow 60 from Airtech, random mats, such as Continuous Strand Mat from Fibre Glast, as well as other mesh or scrim material, or combinations thereof. Another commercially suitable embodiment is the GREENFLOW 75 produced by Airtech Advanced Materials Group. Various compositions are contemplated for use in the woven or non-woven structures. For example, the flow media may comprise polyamide, polypropylene, propylene ethylene copolymer, aluminum screen material or combinations thereof. In a further optional embodiment, it is contemplated to use a peel-ply layer between the hybrid fiber layup and the flow media.

Whether using flow media or not, vacuum conduits and resin conduits are then applied and affixed over the hybrid fiber layup, and optionally the flow media. As used herein, "vacuum conduits" are tubing, tubing connectors, or other suitable components applied on the periphery of the mold or hybrid fiber layup, across the surface of the hybrid fiber layup, or both, wherein the tubing is connected to the vacuum and is utilized to achieve a vacuum underneath the vacuum enclosure. Similarly as used herein, "resin conduits" are tubing, tubing connectors, or other suitable components applied on the periphery of the mold or hybrid fiber layup, across the surface of the hybrid fiber layup, or both, wherein the tubing is connected to the resin infusion device, which may be any suitable vessel. In a specific embodiment, the resin conduit delivers resin material across the thickness of the hybrid fiber layup via the flow media. Various materials are contemplated for the vacuum conduits and resin conduits. For example, flexible tubing such as a polyethylene spiral tube may be utilized. In a further optional embodiment, it is contemplated to use multiple resin conduits for production of large composite part to shorten the time required for resin infusion.

Subsequently, the mold and hybrid fiber layup may then be covered in a vacuum enclosure. The vacuum enclosure may encompass various components suitable for achieving a sealed environment, for example, a container or a polymer vacuum bagging film. The vacuum enclosure is generally affixed to the periphery of the mold via adhesive, tape, putty etc. After the vacuum enclosure is applied over the mold, the vacuum pump is applied to remove air beneath the vacuum enclosure. Creating a vacuum on the vacuum enclosure produces a pressure gradient. For example and not be way of limitation, the pressure gradient is from about 760 torr to about 1 torr. In addition to the use of a vacuum pump to generate the pressure gradient, it is further contemplated to use a pressurized system to generate the necessary pressure difference to infuse resin into the hybrid fiber layup.

After the layup process is complete, a release ply, additional layers of flow media, and vacuum bag film may be placed on top of the hybrid fiber layup and sealed onto the foam tool with vacuum tape. The stack is then put under vacuum before polymer resin is vacuum-infused into the hybrid fiber layup, primarily into the dry fiber strips. Without being limited to theory, the presence of dry fiber strips within the hybrid fiber layup before infusion allows for improved breathing of trapped air, removal of volatiles and improved compaction with only atmospheric pressure, mimicking the double vacuum debulking (DVD) process without the added equipment. Vacuum cycling at the end of the layup can be performed for compaction instead of time-intensive debulking steps throughout the layup.

The polymer resin may then be infused into the hybrid fiber layup to "wet out" or fill available contact surfaces, which primarily means the dry fiber strips; however, there is some level of resin infusion in the already resin impregnated prepreg fiber strips. While various reaction conditions are contemplated, the infusion may occur at room temperature while the prepreg resin viscosity is high, (for example, greater than 100,000 centipoise at room temperature), thus limiting resin mixing. In some embodiments, the hybrid fiber layup 101 may be maintained at a temperature between about 10° C. and about 50° C. prior to infusion. In some cases, decreased mixing of the infusion resin with a prepreg resin has been shown to lead to improved flexural performance without a change in interlaminar shear strength. Moreover, it was previously thought that the use of prepreg fiber material would severely impede resin infusion processes, especially through the layers of layup in a composite (i.e. vertically from the top to the bottom). However, the hybrid fiber composite of the present disclosure facilitates an infusion process throughout the layers, leading to a consolidated, cured composite with less dry spots and defects.

The polymer resin used in the infusion step may be the same resin or a different resin from the polymer resin already impregnated in the prepreg fiber strips. For example, in one or more embodiments, the infused polymer resin may comprise uncured thermoset resin. In one or more embodiments, the uncured thermoset resin may comprise one or more components selected from the group consisting of epoxy, bismaleimide, vinyl ester, polyester, and combinations thereof. In embodiments wherein the polymer resin is an uncured thermoset epoxy resin, the uncured epoxy resin may comprise at least one component selected from the group consisting of diglycidyl ether of bisphenol A, diglycidyl ether of bisphenol F, resorcinol diglycidyl ether, N,N-Diglycidyl-4-glycidyloxyaniline, brominated diglycidyl ether of bisphenol A, novolac epoxy, tetraglycidyl meta-xylenediamine, 1,4-butanediol diglycidyl ether, 4,4'-Methylenebis (N,N-diglycidylaniline), tris(4-hydroxyphenyl)methane triglycidyl ether, and tris(2,3-epoxypropyl)isocyanurate. In further embodiments, the uncured epoxy resin may have an enthalpy of reaction range of about 500 to about 800 J/g and may have a viscosity range from about 100 to about 600 centipoise at 20° C.

In accordance with further embodiments, the polymer resin may also comprise a curing agent, for example, an amine curing agent. Various amine curing agents are contemplated, for example, aromatic amine curing agents, aliphatic amine curing agents, cycloaliphatic amine curing agents, and combinations thereof. For example and not by way of limitation, the aromatic amine curing agent may include one or more of 4,4'-methylene-bis(2-chloroaniline), 4,4-diaminodiphenyl sulfone, diethyltoluenediamine, dimethylthiotoluenediamine; 4,4'-diaminodiphenylmethane; 1,3'-phenylenediamine, m-xylylenediamine, and 2,4-diaminotoluene. The cycloaliphatic amine curing agent may include one or more of isophorone diamine, piperazine, aminoethyl piperazine, 5-amino-1,3,3-trimethylcyclohexanemethylamine, and bis(p-aminocyclohexylmethane. Moreover, the aliphatic amine curing agent may comprise one or more of triehylenetetramine, and N,N-dimethylethylenediamine.

Commercially suitable resins may include the NONA resins produced by Cornerstone Research Group for production of fiber-reinforced epoxy composites. The NONA resins may include NONA R404/H18, NONA R102/H11 (RT-177) or any combinations thereof.

After infusion, the dry fiber material infused with uncured epoxy resin and curing agent, and the prepreg material are both cured to achieve the fiber-reinforced polymeric composite having a glass transition temperature of at least 70° C., preferably at least 120° C. and more preferably at least 177° C. The curing may occur with or without the use of external heat, with the condition that the external heat is not provided by an autoclave. In one or more embodiments, the curing step converts the partially cured resin of the prepreg material to a fully cured resin and converts the infused uncured resin to a fully cured resin.

In accordance with some embodiments, at least one non-autoclave heating process is a no-oven no-autoclave process. The no-oven no-autoclave process is described in U.S. patent application Ser. No. 14/045,400, referenced above and incorporated by reference herein in its entirety. In this no-oven no-autoclave process, the curing step utilizes the exothermic heat generated by the reaction of uncured epoxy resin and curing agent to drive the curing process. The no-oven no-autoclave process utilizes thermal insulation to ensure that the exothermic heat is maintained, and thereby eliminates the need for an alternative heating source such as an oven or autoclave. In accordance with some embodiments, the thermal insulation may be selected from fiberglass, cellulose, polymer foams, earth materials, and combinations thereof. The method for producing a fiber-reinforced polymeric composite may further comprise applying a radiative insulation sheet over the vacuum enclosure. The radiative insulation sheet minimizes heat loss caused by radiation. In that way, the insulation sheet may work synergistically with the thermal insulation that reduces conductive heat loss while the radiative insulation sheet reduces heat loss via radiation. Various materials are contemplated for use in the radiative insulation sheet. In one embodiment, the radiative insulation sheet is aluminum foil.

In another embodiment, at least one non-autoclave heating process may be an oven heating process, which operates at temperatures of at least 120° C. Optionally, the methods for producing a fiber-reinforced polymeric composite may also further comprise post-curing the hybrid fiber layup in an oven at about 180° C. to about 250° C. Without being limited to theory, the type of prepreg fiber material used may dictate whether a post-cure is necessary.

In one or more curing processes, it is contemplated to use a combination of curing procedures. For example, it is contemplated to use an initial no-oven, no-autoclave curing process followed up by a subsequent post-cure process in an oven.

The curing step(s) may be controlled and optimized so that the curing may occur over a period from about 6 hours to about 24 hours, or from about 6 hours to 14 hours, or from about 6 hour to 8 hours. This curing time may include oven temperature ramp-up time. After curing, the resultant composite is a fiber-reinforced polymeric composite (e.g., fiber-reinforced epoxy composite) having a glass transition temperature of at least about 70° C., or from about 100 to about 300° C., or from about 120 to about 210° C., or from about 150 to about 210° C., or at least about 180° C. Moreover, the cured fiber-reinforced epoxy composite defines a curing dimensional change value (i.e. deviation in dimensions of cured composite from the original dimensions of the tool surface at ambient temperature) of less than about 2500 µm/m, or less than about 2000 µm/m, or less than about 1500 µm/m. Without being bound by theory, the present curing process yields a more uniform curing profile, which provides advantages to the final product such as improved dimensional tolerance. Furthermore, the uniformity of internal heating by the resin exothermic heat also provides advantages in reducing residual stress within the composite and improving in-plane shear properties.

Upon completion of these method steps, a fiber-reinforced polymeric composite comprising a plurality of prepreg zones and a plurality of non-prepreg zones disposed across the fiber-reinforced polymeric composite. In specific embodiments, the fiber-reinforced polymeric composite may have interconnected prepreg zones and a plurality of interconnected non-prepreg zones. As used herein, "the prepreg zones" are the cured composite zones produced from curing the prepreg fiber strips, whereas "the non-prepreg zones" are the cured composite zones produced from curing the resin infused dry fiber strips. The prepreg zones have a fiber volume fraction greater than a fiber volume fraction of the non-prepreg zones. The fiber-reinforced polymeric composite may, in some embodiments, have a glass transition temperature ($T_g$) from about 70° C. to about 250° C. The fiber-reinforced epoxy may also exhibit a $T_g$ in some embodiments from about 120° C. to about 210° C. The fiber-reinforced polymeric composite may have a glass transition temperature from about 120° C. to about 210° C. after curing for a period of about 2 to about 14 hours.

Referring to the embodiment of FIG. 2, if you assume that layer 202 is the top layer and layer 203 is the bottom, curing will produce prepreg zones and non-prepreg zones in the top surface, which corresponds to layer 202, and in the bottom surface, which corresponds to layer 203. In alternative embodiments, it is contemplated that only the top surface or only the bottom surface of the fiber-reinforced polymeric composite includes one or more prepreg zones and one or more non-prepreg zones.

The fiber-reinforced polymeric composite in some embodiments may exhibit a lower void content, because the dry fiber strips in the hybrid fiber layup act as a better air-bleed path during the vacuum infusion step. The void content may be homogenous across the composite or may vary. The fiber-reinforced polymeric composite may, in some embodiments, have a void content less than 1.0%, or about less than 0.5%. Void volume may be determined experimentally via acid digestion methods or by microscopy techniques which are known to those of ordinary skill in the art.

As stated above, the fiber-reinforced polymeric composite may have non-homogenous fiber volumes exhibited in various regions. In one or more embodiments, the prepreg zones may include a fiber volume fraction greater than 60%, or greater than 65%, or from greater than 60% to about 70%. In other embodiments, the non-prepreg zones may include a fiber volume fraction less than 60%, or less than 55%, or from less than 60% to about 50%. Fiber volume may be determined experimentally via acid digestion methods which are known to those of ordinary skill in the art.

Further, in some embodiments, the fiber reinforced epoxy composite may comprise an OHC strength of at least 250 MPa, or at least 275 MPa. Without being limited to theory, the improved properties of the composite are due in part to the interaction between the prepreg fiber strips and the resin infused dry fiber strips. The prepreg fiber strips may bleed resin during heating and compaction, and in some embodiments of the present disclosure, the prepreg resin can enter the dry fibers to move the interface into the dry fiber layup to encourage moderate blending of prepreg resin and dry fiber infusion resin as needed. Further, the fiber-reinforced polymeric composite may, in some embodiments, have an interface between the dry fiber strips and the prepreg fiber strips so as to diffuse a blend of both resin systems and cross-link the two matrices of dry fiber material and prepreg fiber material. In some embodiments, this cross-linking of the two matrices of dry fiber material and prepreg fiber material may be used as a toughening mechanism. Further, regions exhibiting blended matrices may, in some embodiments, exhibit properties differing from those exhibited by the non-blended regions. These differing properties may allow for the fiber-reinforced polymeric composite to exhibits regions of differing properties, for example, a stiffer region (i.e., the non-prepreg zone) alongside a strong, tougher region (i.e., the prepreg zone).

Examples

Figure 3:
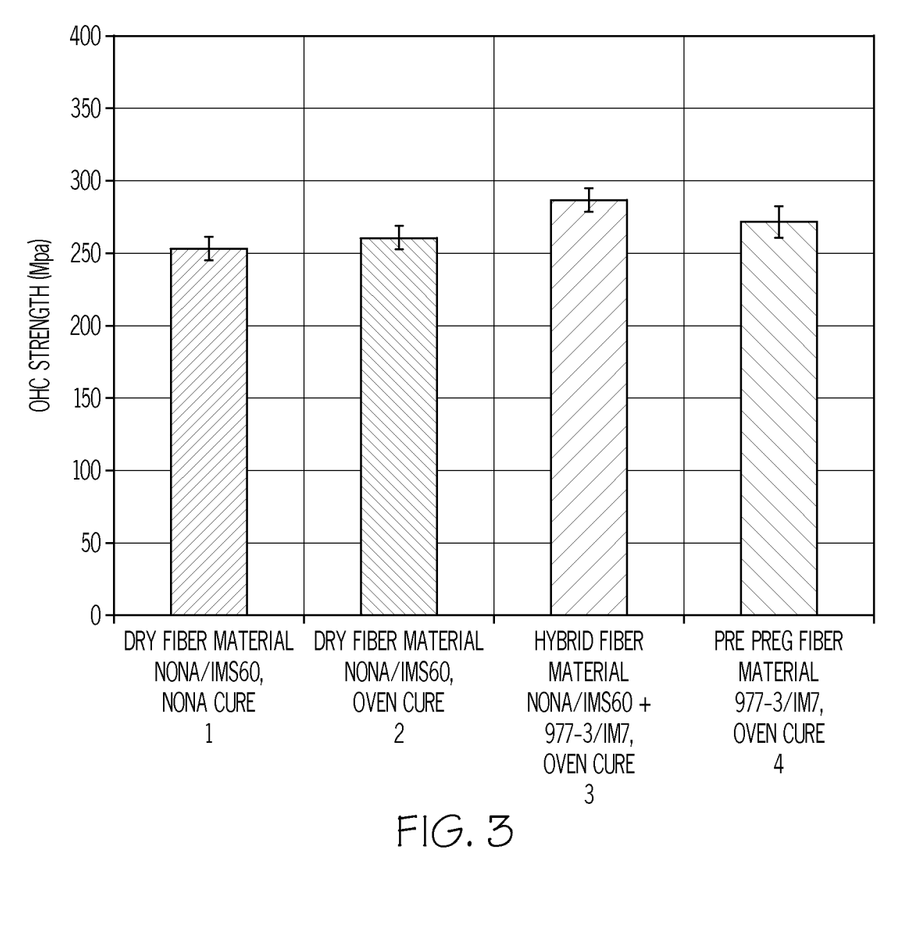
FIG. 3 is a graphical representation of the open hole compression (OHC) strength of the fiber-reinforced polymeric composites produced by the hybrid fiber layup compared to fiber-reinforced polymeric composites produced from dry fiber infusion or prepreg fiber according to one or more embodiments of the present disclosure.

FIG. 3 is a graphical representation illustrating the increased compression strength of the hybrid fiber composite when compared to non-hybrid dry fiber composites and a non-hybrid prepreg composite. Specifically, FIG. 3 shows open hole compression (OHC) strength (in MPa) along the y-axis with various composites along the x-axis. Beginning on the far left, Bar 1 represents a NONA resin infused in IMS60, a unidirectional dry carbon fiber, which was cured using the no-oven, no-autoclave process, utilizing only the exothermic heat generated by the reactive resin without additional oven heating or postcure process. The total curing time was less than 6 hours. Bar 2 represents a NONA resin infused in IMS60, a unidirectional dry carbon fiber, which was cured with the same no-oven, no-autoclave process as described for Bar 2, followed by a heating cycle typically used for epoxy composite fabrication. Specifically, an oven postcure was conducted at a temperature of 180° C. for 2 hours. Bar 3 represents an example embodiment of the presently fiber-reinforced polymeric composite produced from a hybrid fiber layer comprising IMS60 unidirectional dry carbon fiber strips infused with NONA resin and 977-3/IM7 prepreg carbon fiber strips cured by the no-oven, no-autoclave process followed by oven postcure of the resulting composite at 180° C. for 6 hours. Finally, Bar 4 represents a non-hybrid composite of 977-3/IM7 prepreg carbon fiber that has been oven cured at 120° C. and 4 hours, followed by a postcure heating cycle at 180° C. for 6 hours, with a total curing time of about 12 hours (including 2 hour temperature ramp-up time for oven). FIG. 3 shows that the fiber composite (Bar 3) has superior OHC strength than a non-hybrid unidirectional dry carbon fiber composite (Bars 1 and 2) and even outperforms a non-hybrid prepreg carbon fiber composite (Bar 4).

FIG. 3 is based on data from an OHC test (NAI-1504C), which is a standard testing method that quantifies the toughness of a composite laminate. All of the cured composites, except the first sample represented by Bar 1 were post-cured at the same elevated temperature before testing. For the current hybrid composite example, mechanical testing panels were made with combinations of Cycom® 977-3/Hexcel® IM7 autoclave prepreg systems, TENAX® IMS60 unidirectional dry carbon fiber, and NONA RT177 epoxy resin infusion. Other possible combination includes MTM® 45-1/Hexcel® IM7 prepreg system, TENAX® IMS60 and NONA RT177 epoxy resin. A 1:1 area ratio of prepreg fiber strips to dry fiber strips per ply was maintained for all hybrid panels, with two tape widths used of ¾" and 1.5". With the Cycom® 977-3 hybrid panel using ¾" wide tape, an OHC strength of about 287 MPa prepreg performance was achieved.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for producing a fiber-reinforced polymeric composite comprising:
   providing a mold defining a shape for the fiber-reinforced polymeric composite;
   applying a hybrid fiber layup over the mold, wherein the hybrid fiber layup comprises one or more layers, wherein each layer comprises one or more dry fiber strips and one or more prepreg fiber strips arranged side by side across each layer, wherein the prepreg fiber strips comprise fiber material impregnated with polymer resin and the dry fiber strips comprise fiber material without impregnated polymer resin;
   covering the mold and the hybrid fiber layup in a vacuum enclosure;
   performing a vacuum on the vacuum enclosure to produce a pressure gradient;
   infusing a reactive mixture of uncured polymer resin and curing agent into the hybrid fiber layup under vacuum conditions; and
   producing the fiber-reinforced polymeric composite by curing the dry fiber strips infused with polymer resin and curing agent and the prepreg fiber strips, wherein the fiber-reinforced polymeric composite has a glass transition temperature of at least about 100° C.

2. The method of claim 1 wherein the polymer resin in the dry fiber strips, the prepreg fiber strips, or both is selected from the group consisting of epoxy, bismaleimide, vinyl ester, polyester, cyanate ester, and combination thereof.

3. The method of claim 1 wherein:
   the polymer resin in the reactive mixture comprises at least one component selected from the group consisting of Diglycidyl ether of bisphenol A, diglycidyl ether of bisphenol F, resorcinol diglycidyl ether, N,N-Diglycidyl-4-glycidyloxyaniline, brominated diglycidyl ether of bisphenol A, novolac epoxy, tetraglycidyl meta-xylenediamine, 1,4-butanediol diglycidyl ether, 4,4'-Methylenebis(N,N-diglycidylaniline), tris(4-hydroxyphenyl)methane triglycidyl ether, tris(2,3-epoxypropyl)isocyanurate, N,N-diglycidylaniline, 1,4 cyclohexanedimethanol diglycidyl ether, and combinations thereof, and the curing agent in the reactive mixture comprises at least one component selected from the group consisting of 4,4'-Methylene-bis(2-chloroaniline), 4,4'-diaminodiphenyl sulfone, isophorone diamine, Diethyltoluenediamine, Dimethylthiotoluenediamine, 4,4'-diaminodiphenylmethane, 1,3'-phenylenediamine, piperazine, Triethylenetetramine, 5-Amino-1,3,3-trimethylcyclohexanemethylamine, m-Xylylenediamine, bis(p-aminocyclohexylmethane), 2,4-Diaminotoluene, N,N, dimethylethylenediamine, Aminoethyl piperazine, Isophoronediamine, Cyclohexylamine, and combinations thereof.

4. The method of claim 1 wherein curing is initiated by a no-oven, no-autoclave process which utilizes exothermic heat generated by the infused resin.

5. The method of claim 1 wherein curing is initiated by an external heat source, wherein the external heat source is not an autoclave.

6. The method of claim 1 wherein the hybrid fiber layup is provided onto the mold without adhesive due to tackiness of the prepreg fiber strips.

7. The method of claim 1 wherein the hybrid fiber layup is applied with automated fiber placement equipment.

* * * * *